United States Patent [19]
Hansen

[11] Patent Number: 5,812,439
[45] Date of Patent: Sep. 22, 1998

[54] TECHNIQUE OF INCORPORATING FLOATING POINT INFORMATION INTO PROCESSOR INSTRUCTIONS

[75] Inventor: Craig C. Hansen, Los Altos, Calif.

[73] Assignee: MicroUnity Systems Engineering, Inc., Sunnyvale, Calif.

[21] Appl. No.: 541,643

[22] Filed: Oct. 10, 1995

[51] Int. Cl.$^6$ ............................................. G06F 7/38
[52] U.S. Cl. ............................ 364/748.03; 395/563
[58] Field of Search ..................... 364/748, 745, 364/736.5, 748.02, 748.03, 748.04, 748.05, 745.01, 745.02, 745.03, 745.04; 395/562, 563

[56] References Cited

U.S. PATENT DOCUMENTS

| | | | |
|---|---|---|---|
| 4,338,675 | 7/1982 | Palmer et al. | 364/748 |
| 4,879,676 | 11/1989 | Hansen | 364/748 |
| 4,961,161 | 10/1990 | Kojima | 364/736.5 |
| 5,341,320 | 8/1994 | Trissel et al. | 364/248 |
| 5,408,427 | 4/1995 | Einaj et al. | 364/748.02 |
| 5,548,545 | 8/1996 | Brashears et al. | 364/748 |
| 5,559,977 | 9/1996 | Avnon et al. | 364/748 |
| 5,600,584 | 2/1997 | Schlafly | 364/745 |

FOREIGN PATENT DOCUMENTS

| | | |
|---|---|---|
| 0 316 904 | 5/1989 | European Pat. Off. . |
| 0 331 372 | 9/1989 | European Pat. Off. . |

OTHER PUBLICATIONS

Power PC 601; RISC Microprocessor User's Manuel; pp. 2–47 through 2–57 and 3–45 through 3–49, 1993.

G.J. Balm et al., IBM Technical Disclosure Bulletin, Jan. 1978, vol. 20 No. 8 pp. 3267–3272.

*Primary Examiner*—David H. Malzahn
*Attorney, Agent, or Firm*—Burns, Doane, Swecker & Mathis, L.L.P.

[57] ABSTRACT

A floating point system and method employing instructions where instruction have incorporated floating point information. The floating point information indicates whether an exception trap should occur and the type of rounding to be performed upon "inexact" arithmetic results. The floating point information further indicates whether other floating-point exception traps should occur. This information allows dynamic (e.g. instruction-by-instruction) modification of various operating parameters of the CPU without modifying information in status registers using special instructions or modes, thereby increasing overall CPU performance. The technique is also supported by several mechanisms for providing precise floating-point exceptions.

16 Claims, 5 Drawing Sheets

```
 31           24 23      18 17     12 11      6 5        0
┌──────────────┬──────────┬──────────┬──────────┬──────────┐
│    major     │    ra    │    rb    │    rc    │    rd    │
└──────────────┴──────────┴──────────┴──────────┴──────────┘
       8           6          6          6          6
```

FIG. 2

```
 31           24 23      18 17     12 11      6 5        0
┌──────────────┬──────────┬──────────┬──────────┬──────────┐
│    major     │    ra    │    rb    │    rc    │  minor   │
└──────────────┴──────────┴──────────┴──────────┴──────────┘
       8           6          6          6          6
```

FIG. 3A

```
 31           24 23                          6 5        0
┌──────────────┬──────────────────────────────┬──────────┐
│    major     │           OTHER              │  minor   │
└──────────────┴──────────────────────────────┴──────────┘
       8                    18                      6
```

FIG. 3B

```
 31           24 23      18 17     12 11      6 5        0
┌──────────────┬──────────┬──────────┬──────────┬──────────┐
│    major     │    ra    │    rb    │  unary   │  minor   │
└──────────────┴──────────┴──────────┴──────────┴──────────┘
       8           6          6          6          6
```

FIG. 4A

```
 31           24 23      18 17     12 11      6 5        0
┌──────────────┬──────────┬──────────┬──────────┬──────────┐
│    major     │  other   │  other   │  unary   │  minor   │
└──────────────┴──────────┴──────────┴──────────┴──────────┘
       8           6          6          6          6
```

FIG. 4B

```
 31  29 28 27 25 23                        6 5  3 2    0
      26 24
┌────┬─┬────┬────┬──────────────────────────┬─────┬─────┐
│ 2  │G│type│prec│          OTHER           │round│ op  │
└────┴─┴────┴────┴──────────────────────────┴─────┴─────┘
  3   1  2    2              18                3     3
```

FIG. 5

TECHNIQUE OF INCORPORATING FLOATING POINT INFORMATION INTO PROCESSOR INSTRUCTIONS

FIELD OF THE INVENTION

The present invention relates to floating point processing techniques used in central processing units and particularly to encoding floating point information within processor instructions.

BACKGROUND OF THE INVENTION

Processors generally use a status register to store mode bits or other types of status information to indicate a current mode that they are operating in. Such status flags or "mode bits" indicate certain types of information such as whether certain types of interrupts or traps have been enabled by the processor, or the status registers indicate a need for a special processor mode(s) such as a supervisor or protected mode. Usually, these status registers require the use of special instructions that modify the operating status of the processor by changing information contained in the status register(s). In addition, some processors require being reset or partially reset prior to operation in the new mode as indicated by the flags in the status registers. Due to the processing time consumed by executing these additional mode modification instructions, as well as processing down time incurred while reset sequences are performed, the flexibility and performance of prior art high-performance processors are limited.

One function which is sometimes controlled by flags or mode bits in status registers is the indication of a rounding option to be used in calculations. Most floating point calculations require that the resultant be rounded in the same manner. In fact, certain processors specify an option wherein if a round must occur, a "inexact" trap or exception is indicated to the user by the processor. That is, the user is alerted through an exception if the inexact flag has been set in the status register, and a rounding operation is being performed. Since most results cannot be represented in a computer system exactly, these exceptions occur frequently.

There are generally five different exception types which may occur in processors of prior art systems and there are typically four different ways to round results in the case of an inexact exception. These exception and rounding types are listed below and are described in detail in IEEE Standard 754-1985.

Exceptions:
1. V—illegal operation—an illegal operation was attempted to be executed;
2. Z—divided by zero—an attempt to divide a number by zero was made;
3. O—overflow—the calculated value exceeds the precision of the format;
4. U—underflow—the calculated value was smaller than the precision of the format.
5. X—inexact—the result needs to be rounded;

Rounding Types:
1. N—round to the nearest representable value in the specified precision;
2. T—round to zero (truncate);
3. F—round to negative infinity (the next lowest value in a negative direction).
4. C—round to positive infinity (the next highest value in a positive direction); and Exceptions 1 through 4 occur infrequently in a computer system, however, inexact exception 5 occurs very frequently because the precision of representing numbers in a floating-point storage format is finite, and because certain values cannot be represented exactly in a finite storage format (such as the value of ⅓, for instance). When inexact exceptions are generated, CPU overhead is consumed by servicing those traps. What is needed is a more efficient manner in which to handle inexact and other exceptions and rounding of results within a computer system.

It is further desired to provide a computer system in which such floating-point exceptions are signaled in a precise manner. Precise exceptions are exceptions in which the original source operands of the instruction are still available, and other processor state is set such that instructions that follow the floating-point exception have not altered the processor state. Precise floating-point exceptions are desirable, as such exceptions are simpler for software to handle and to provide support for diagnosing software errors.

SUMMARY OF THE INVENTION

The present invention is a method, instruction, and system which utilizes a central processing unit (CPU) that employs instructions incorporating floating point mode information. In one embodiment of the present invention the information comprises a flag that indicates whether a trap (or exception) should be generated or when an arithmetic result is computed which cannot be precisely represented in a register of the CPU (for instance the value of ⅓) and the result must be rounded in some way. If the flag is set indicating that the mathematical resultant should be rounded, the instruction further comprises information regarding the type of rounding which should be performed upon the resultant. In one embodiment rounding, traps, and exceptions are handled as shown in the table below depending on rounding information and flag state. In a first case all exceptions traps are enabled for all exceptions types (i.e., illegal op (V), divide by zero (Z), underflow (U), and overflow (O)) except for an inexact exception (X) and rounding of an inexact exception is handled by either truncating (T), rounding to the nearest value represented in a given register precision (N), rounding to the nearest value in the positive direction (C), and rounding to the nearest value in the negative direction (F). In a second case, no exception traps are enabled such that all exceptions (V,Z,U,O, and X) are handled using IEEE standard default exception handling. And in a third case all traps are enabled and occur for all exceptions (V,Z,U,O, and X) and no rounding occurs.

|   |   | rounding | V illegal op | Z divide by zero | U underflow | O overflow | X inexact |
|---|---|---|---|---|---|---|---|
| 0 | N | nearest or even | trap | trap | trap | trap | default |
| 1 | T | truncate toward zero | trap | trap | trap | trap | default |
| 2 | F | floor: toward −∞ | trap | trap | trap | trap | default |

-continued

|   |        | rounding          | V illegal op | Z divide by zero | U underflow | O overflow | X inexact |
|---|--------|-------------------|--------------|------------------|-------------|------------|-----------|
| 3 | C      | ceiling: toward +∞ | trap         | trap             | trap        | trap       | default   |
| 4 | (none) | nearest or even   | default      | default          | default     | default    | default   |
| 5 | x      | exact             | trap         | trap             | trap        | trap       | trap      |
| 0 | (none) | default           | default      | N/A              | N/A         | N/A        | N/A       |
| 1 | X      | exception         | trap         | N/A              | N/A         | N/A        | N/A       |

The present invention also is a method and system which utilizes stall control and floating-point exception prediction to produce precise floating-point exception traps even when the delay of the floating-point unit may be greater than the delay that the processor takes before committing computed results.

BRIEF DESCRIPTION OF THE DRAWINGS

FIGS. 2, 3A, 3B, 4A & 4B are diagrams showing the general forms of instructions of the present invention.

FIG. 5 shows the encoding of instructions that provide for the direct decoding of particular features.

DETAILED DESCRIPTION

Figure 1:
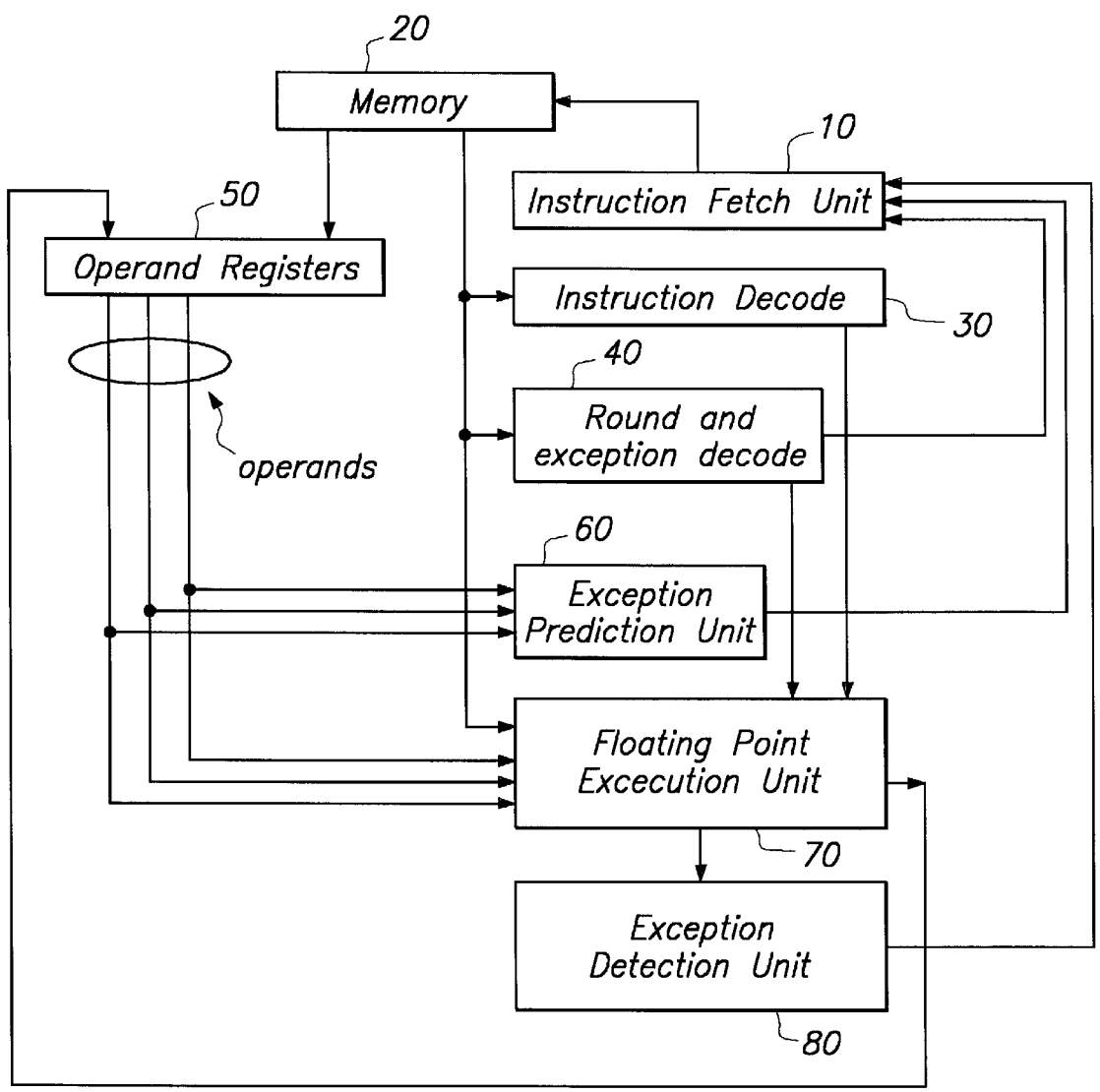
FIG. 1 shows a diagram of the system with the relationship between functional blocks of the system.

A method, processor instruction, and system for implementing a processor utilizing floating point instructions having incorporated floating point information is described. In the following description, for the purposes of explanation, numerous specific details are set forth such as mode information, floating point instructions, and field size, etc. in order to provide a thorough understanding of the invention. It will be obvious, however, to one skilled in the art that the invention may be practiced without these specific details. In other instances, well known circuits, structures, and techniques have not been shown in detail in order not to unnecessarily obscure the present invention.

The present invention is a method of providing control of floating-point rounding modes from within the processor's instruction, rather than from external control or status information or registers. Providing control in this manner permits instructions which use distinct rounding modes or exception processing to be intermixed without regard to requirements of having intervening instructions which change rounding modes or which flush or resynchronize execution pipelines to facilitate such a change such as is done in prior art exception methods.

The method and system of the present invention also does away with implicit state which is updated by the execution of a floating-point operation, in particular the "sticky-exception" bits of the IEEE-standard. These are not appropriate in an environment where fine control of exceptions is desired and cause implementation difficulties in a pipelined design, such as the present invention. When absolutely required, these can be simulated in software, using the exception facilities provided in hardware. Therefore, another objective of the present invention is to permit such simulation of sticky-exception bits in software.

In its simplest form, the method of the present invention can be implemented using five bits of control for each exception type (V, Z, U, O and X), and two bits to select rounding (N, T, C, F). However, using seven bits requires additional operation code space within the instruction, and for fixed-size 32-bit instructions as in the present embodiment, this use of operation code space limits the set of additional operations the processor can perform, including limiting the possibilities for further instruction set enhancement. In addition, some operations which require many operand specifications do not have enough room to specify the operation, seven bits for exception and rounding mode, and four register operands.

Consequently, in another embodiment of the present invention sufficient control of exceptions and rounding modes to allow most of the flexibility of the 7-bits of control described above, is provided using much less operation code space. In this embodiment of the present invention, three bits of control information permits 1) the selection of an arbitrary rounding mode (N, T, C, F) with all exception traps excluding inexact (X) enabled (V, Z, U, O), 2) the round-to-nearest rounding with no exception traps enabled, and 3) selection of all exception traps, including inexact (X) enabled (V, Z, U, O, X), with no rounding.

Operations which require much of the instruction set space for operands (such as MULADD or MULSUB) are provided in a default form with all exception traps disabled and round-to-nearest rounding. Other rounding and exception selections are available by using separate instructions (MLUL and ADD or SUB), in which the instruction set space is available for finer control of rounding and exceptions.

System Overview

FIG. 1 illustrates one embodiment of the system of the present invention employing the method of the present invention of incorporating rounding and exception control into floating point instructions. The system shows instruction fetch unit 10 which accesses a floating point instruction from memory 20 with a current program addresses. Memory 20, in response, couples portions of the floating point instruction of the present invention to each of: instruction decode 30, round and exception decode 40, operand registers 50, and floating point execution unit (FPU) 70. Instruction decode 30 decodes the floating point instruction and provides decoded instruction information including operation type and precision type to FPU 70. Round and exception decode 40 decodes a portion of the instruction bits representing rounding and exception information and generates a round control signal (coupled to FPU 70) and a set of trap enable signals (coupled to both FPU 70 and exception detection unit 80). Round and exception decode 40 can also generate a system stall signal (which is coupled to fetch unit 10) as dictated by the rounding and exception information in the case of an exact condition. The operands from register 50 are coupled to exception prediction unit 60. Unit 60 evaluates the exponent, significant, and sign of the operands and predicts whether an exception will occur. If so, unit 60 generates an interrupt signal. The operands are also coupled to FPU 70. FPU 70 performs the floating point operation according to the decoded information provided by instruction decode 30 and the round and exception information provided by decode 40. The result of the floating point operation performed by FPU 70 is coupled back to registers 50. FPU 70 may also generate an inexact or interrupt signal depending on the outcome of the floating point operation.

A first general form of instructions of the present invention coded by a major operation code is shown in FIG. 2; a second general form of instructions of the present invention coded by major and minor operation codes is shown in FIG. 3A; and a third general form of instructions of the present invention coded by major, minor, and unary operation codes is shown in FIG. 4A:

The specific major operation codes of instructions performed with respect to the above three general instruction forms are listed in Table 1 below.

TABLE 1-continued major operation code field values

| MAJOR | |
|---|---|
| 90 | |
| 91 | |
| 92 | GF.16 |
| 93 | GF.32 |
| 94 | GF.64 |
| 95 | GF.128 |

In an instruction having the major operation field values F.16, F.32, F.64, GF.16, GF.32, GF.64, GF.128 as shown in Table 1 and in which the lowest-order six bits in the instruction specify a minor operation code, the instruction takes the second general form including a major and minor operation code as shown in FIG. 3B:

Tables 2 and 3 lists the minor operation code field values used in the second general form of the instruction of the present invention which is in the format using both the major and minor operation codes.

TABLE 2 minor operation code field vlaues for F.size

| F.size | 0 | 8 | 16 | 24 | 32 | 40 | 48 | 56 |
|---|---|---|---|---|---|---|---|---|
| 0 | FADD.N | FADD.T | FADD.F | FADD.C | FADD | FADD.X | FSETE | FSETE.X |
| 1 | FSUB.N | FSUB.T | FSUB.F | FSUB.C | FSUB | FSUB.X | FSETNUE | FSETNUE.X |
| 2 | FMUL.N | FMUL.T | FMUL.F | FMUL.C | FMUL | FMUL.X | FSETNUGE | FSETNGE.X |
| 3 | FDIV.N | FDIV.T | FDIV.F | FDIV.C | FDIV | FDIV.X | FSETNUL | FSETNUL.X |
| 4 | F.UNARY.N | F.UNARY.T | F.UNARY.F | F.UNARY.C | F.UNARY | F.UANRY.X | | |
| 5 | | | | | | | | |
| 6 | | | | | | | | |
| 7 | | | | | | | | |

TABLE 1 major operation code field values

| MAJOR | |
|---|---|
| 64 | FMULADD16 |
| 65 | FMULADD32 |
| 66 | FMULADD64 |
| 67 | |
| 68 | FMULSUB16 |
| 69 | FMULSUB32 |
| 70 | FMULSUB64 |
| 71 | |
| 72 | |
| 73 | |
| 74 | |
| 75 | |
| 76 | F.16 |
| 77 | F.32 |
| 78 | F.64 |
| 79 | |
| 80 | GFMULADD16 |
| 81 | GFMULADD32 |
| 82 | GFMULADD64 |
| 83 | GFMULADD128 |
| 84 | GFMULSUB16 |
| 85 | GFMULSUB32 |
| 86 | GFMULSUB64 |
| 87 | GFMULSUB128 |
| 88 | |
| 89 | |

TABLE 3

| | | | minor operation code field values for GF.size | | | | | |
|---|---|---|---|---|---|---|---|---|
| GF.size | 0 | 8 | 16 | 24 | 32 | 40 | 48 | 56 |
| 0 | GFADD.N | GFADD.T | GFADD.F | GFADD.C | GFADD | GFADD.X | GFSETE | GPSETE.X |
| 1 | GFSUB.N | GFSUB.T | GFSUB.F | GFSUB.C | GFSUB | GFSUB.X | GFSETNUE | GFSETNUE.X |
| 2 | GFMUL.N | GFMUL.T | GFMUL.F | GFMUL.C | GPMUL | GFMUL.X | GFSETNUGE | GFSETNGE.X |
| 3 | GFDIV.N | GFDIV.T | GFDIV.F | GFDIV.C | GFDIV | GFDIV.X | GFSETNUL | GFSETNUL.X |
| 4 | GF.UNARY.N | GF.UNARY.T | GF.UNARY.F | GF.UNARY.C | GF.UNARY | GF.UNARY.X | | |
| 5 | | | | | | | | |
| 6 | | | | | | | | |
| 7 | | | | | | | | |

Instructions which have major operation field values F.16, F.32, F.64, with minor operation field values F.UNARY.N, F.UNARY.T, F.UNARY.F, F.UNARY.C, F.UNARY, and F.UNARY.X, and for major operation field values GF.16, GF.32, GF.64, GF.128, with minor operation field values GF.UNARY.N, GF.UNARY.T, GF.UNARY.F, GF.UNARY.C, GF.UNARY, and GF.UNARY.X, another six bits in the instruction specify a unary operation code so that the instruction takes on the third general format as shown in FIG. 4B:

The unary field in this case is filled with a value from one Tables 4 and 5:

TABLE 4

| | unary operation code field values for F.UNARY.size.r | | | | | | | |
|---|---|---|---|---|---|---|---|---|
| F.UNARY.size.r | 0 | 8 | 16 | 24 | 32 | 40 | 48 | 56 |
| 0 | F.ABS | | | | | | | |
| 1 | F.NEG | | | | | | | |
| 2 | F.SQR | | | | | | | |
| 3 | | | | | | | | |
| 4 | F.SINK | | | | | | | |
| 5 | F.FLOAT | | | | | | | |
| 6 | F.INFLATE | | | | | | | |
| 7 | F.DEFLATE | | | | | | | |

TABLE 5

| | unary operation code field values for GF.UNARY.size.r | | | | | | | |
|---|---|---|---|---|---|---|---|---|
| GF.UNARY.size.r | 0 | 8 | 16 | 24 | 32 | 40 | 48 | 56 |
| 0 | GF.ABS | | | | | | | |
| 1 | GF.NEG | | | | | | | |
| 2 | GF.SQR | | | | | | | |
| 3 | | | | | | | | |
| 4 | GF.SINK | | | | | | | |
| 5 | GF.FLOAT | | | | | | | |
| 6 | GF.INFLATE | | | | | | | |
| 7 | GF.DEFLATE | | | | | | | |

The operations performed as indicated by the operation codes listed above in Tables 1–5 are described in Table 6 below. The remaining fields in each of the three general forms of the instructions are used to indicate which registers are the source operands and target for the result of the operation.

TABLE 6

| operation | meaning | operands |
|---|---|---|
| MULADD | multiply and add | 3 |
| MULSUB | multiply and subtract | 3 |
| ADD | add | 2 |
| SUB | subtract | 2 |
| MUL | multiply | 2 |
| DIV | divide | 2 |
| SETE | set if equal | 2 |
| SETNUE | set if not unordered or equal | 2 |
| SETNUGE | set if not unordered, greater or equal | 2 |
| SETNUL | set if not unordered or less | 2 |
| ABS | absolute value | 1 |
| NEG | negate | 1 |
| SQR | square root | 1 |
| SINK | convert from floating to fixed point | 1 |
| FLOAT | convert from fixed to floating point | 1 |
| INFLATE | convert to next larger floating-point format | 1 |
| DEFLATE | convert to next smaller floating-point format | 1 |

The encoding of the instructions listed above in Tables 1–5 provide for the direct decoding of particular features specified by the instruction as shown in FIG. 5.

Bits 25..24 indicate the precision of the operands, as detailed in the Table 7 below:

TABLE 7

| precision encoding of instructions | | | |
|---|---|---|---|
| 24 ... 25 | bits | size | precision |
| 0 | 16 | doublet | half |
| 1 | 32 | quadlet | single |
| 2 | 64 | octlet | double |
| 3 | 128 | hexlet | quad |

For instructions in which bit 27 is cleared (27..26=0 or 1), the rounding selection and exception control is set to the default. For instructions in which bits 27 and 26 are set (27..26=3), the rounding selection and exception control is set by bits 5..3 of the instruction as detailed in Table 8 below:

TABLE 8 rounding/exception encoding of instructions

| 5...3 | mnemonic | meaning | V illegal op | Z divide by zero | U underflow | O overflow | X inexact |
|---|---|---|---|---|---|---|---|
| 0 | xxx.N | nearest | trap | trap | trap | trap | nearest |
| 1 | xxx.T | truncate | trap | trap | trap | trap | truncate |
| 2 | xxx.F | floor | trap | trap | trap | trap | floor |
| 3 | xxx.C | ceiling | trap | trap | trap | trap | ceiling |
| 4 | xxx | default | default | default | default | default | nearest |
| 5 | xxx.X | exact | trap | trap | trap | trap | trap |
| 6 | xxx | default | default | N/A | N/A | N/A | N/A |
| 7 | xxx.X | exception | trap | N/A | N/A | N/A | N/A |

For operations encoded by bits 5..3=6 or 7, the only exception which may occur is V (illegal operation), and no rounding occurs. For these instructions, the selection of 5..3=6 causes the V exception to default, and the selection of 5..3=7 causes the V exception to trap.

Operations are performed upon the operands contained in the register(s) specified in each of the first, second, and third general form instructions, and the result is placed in the register(s) also specified in each instruction.

TABLE 9 round and exception decode PLA

| type 27...26 | round 5...3 | trap enables | | | | | rounding control |
|---|---|---|---|---|---|---|---|
| | | V | Z | U | O | X | |
| 0x | xxx | 0 | 0 | 0 | 0 | 0 | N |
| 11 | 000 | 1 | 1 | 1 | 1 | 0 | N |
| 11 | 001 | 1 | 1 | 1 | 1 | 0 | T |
| 11 | 010 | 1 | 1 | 1 | 1 | 0 | F |
| 11 | 011 | 1 | 1 | 1 | 1 | 0 | C |
| 11 | 100 | 0 | 0 | 0 | 0 | 0 | N |
| 11 | 101 | 1 | 1 | 1 | 1 | 1 | — |
| 11 | 110 | 0 | — | — | — | — | — |
| 11 | 111 | 1 | — | — | — | — | — |

Notes:
1) x means don't care input
2) — means don't care output
3) trap enables V, Z, U, and O may all be combined together into a single signal.

Figure 6A:
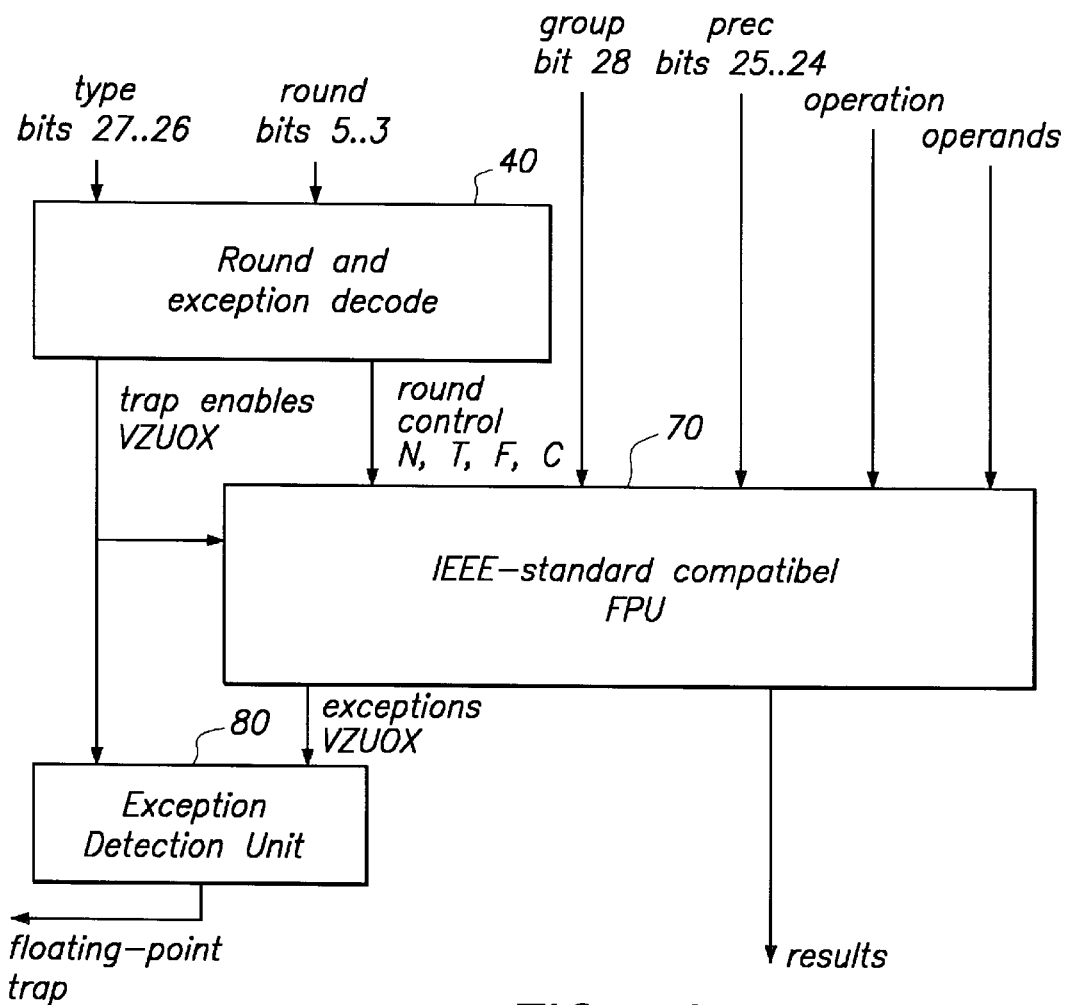
FIG. 6A shows relationship between the rounding and exception decoding logic, the floating-point unit, and the exception trap detection unit.
Figure 6B:
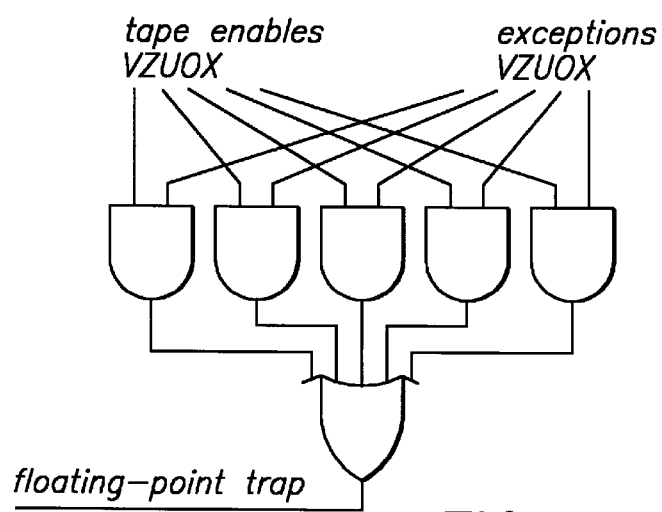
FIG. 6B shows the detailed logic of the exception trap detection unit.

FIG. 6A illustrates the manner in which the above described decoded instruction information, (e.g. exception/rounding signals, operation codes, precision codes) is coupled to round/exception decode 40, FPU 70, and exception detection unit 80 (FIG. 1). FPU 70 receives the operation code, operands, precision bits 25-24, group bit 28, round control and trap enable signals. FPU 70 generates a result or an exception according to this information. Further, FPU 70 generates exception signals VZUOX. Round and exception decode 40 in response to bits 27-26 and round bits 5-3 of the floating point instruction generates a set of rounding control and trap enable signals VZUOX, according to Table 9. These signals are coupled to FPU 70 and exception detection unit 80. FIG. 6B illustrates one manner in which to implement exception detection unit 80 in logic gates. Unit 80, processes the trap and exception signals so as to generate a trap signal in accordance with the results shown in Table 8.

In using the encoded rounding option as specified above, the present invention is able to prevent inexact exceptions from occurring by using one of the other rounding options as specified in Table 8 thus avoiding the overhead typically incurred by modifying status registers, etc. in typical prior art systems. However, if the user wishes to generate an inexact exception, he may specify this dynamically. Also, the need for a status register is eliminated for these applications, as the information is already encoded in the instruction. Therefore, improved system performance may be achieved by decoding and executing fewer instructions, and therefore improving overall system performance.

Precise Floating-point Exceptions

In addition, the design provides for precise floating-point exceptions, in the sense that when a floating-point exception trap occurs, the original source operands are available in the processors registers, and the program counter points at the instruction that was the cause of the exception. Like prior art U.S. Pat. No. 4,879,676, "Method and Apparatus for Precise Floating-point exceptions," this design must deal with the concern that the substantial latency of a floating-point operation may cause a pipelined processor to advance beyond the point at which the original machine state that existed before the instruction was executed can be retrieved. The prior art design includes the means to stall the processor pipeline when a pessimistic computation determines that a floating-point exception may occur.

In the present invention, exception traps are much less likely to be enabled, as the default is to handle floating-point exceptions in the IEEE-standard default manner. Consequently, this design need not stall the processor pipeline for any floating-point operation in which exception handling is defaulted, regardless of the operand values, and thus accomplishes the same advantage as prior art inventions without the need for an exception prediction unit.

Figure 7:
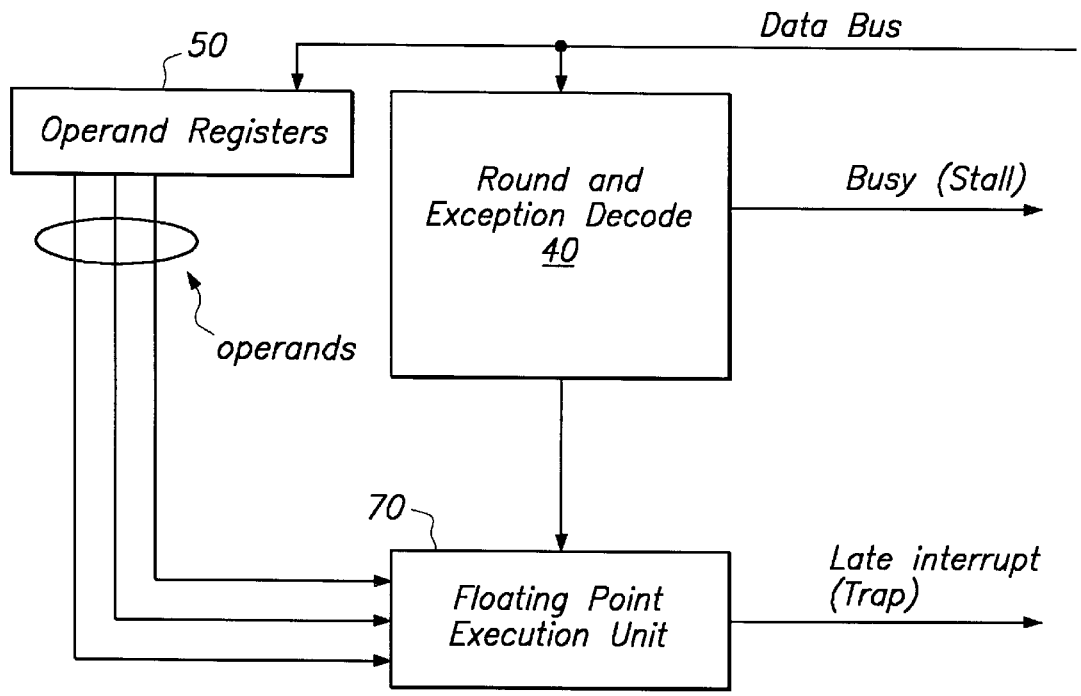
FIGS. 7–9 are diagrams showing the relationship between elements of the floating-point unit that generate stalls and exceptions to generate precise floating-point exceptions in a processor.

FIG. 7 illustrates the floating point system of the present invention which does not employ an exception prediction unit 60. As shown in FIG. 7, for operations in which exception traps are enabled, the processor pipeline may be stalled by round and exception decode 40, regardless of the operand values, in order that a precise determination of whether an exception trap will occur at the end of the floating-point operation.

Another object of the present invention is to permit the floating-point unit 70 to cause a floating-point exception trap when exceptional operands or results would require special handling, such as default IEEE-standard exception handling or handling of denormalized numbers. In such a case, the FPU 70 is not capable of performing the IEEE-standard default handling and thus may cause an exception trap on any instruction, even ones with default handling specified.

Figure 8:
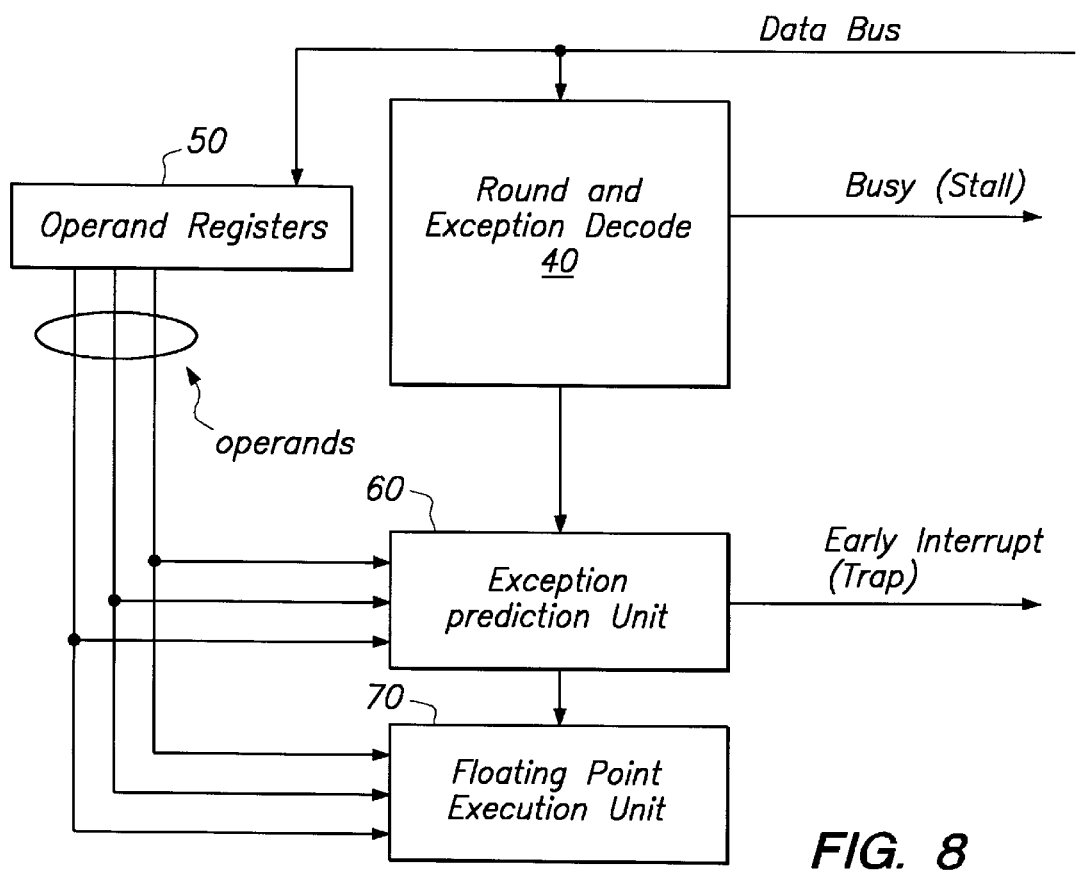

As indicated in FIG. 8, to handle exceptional operands, exception prediction unit 60 is introduced into the floating point system (also including FPU 70 and exception decode 40), and to further simplify such exception handling, the prediction of an exception may itself cause an exception trap. Note particularly that even in this case, the operand values are not used to cause the processor pipeline to stall.

Figure 9:
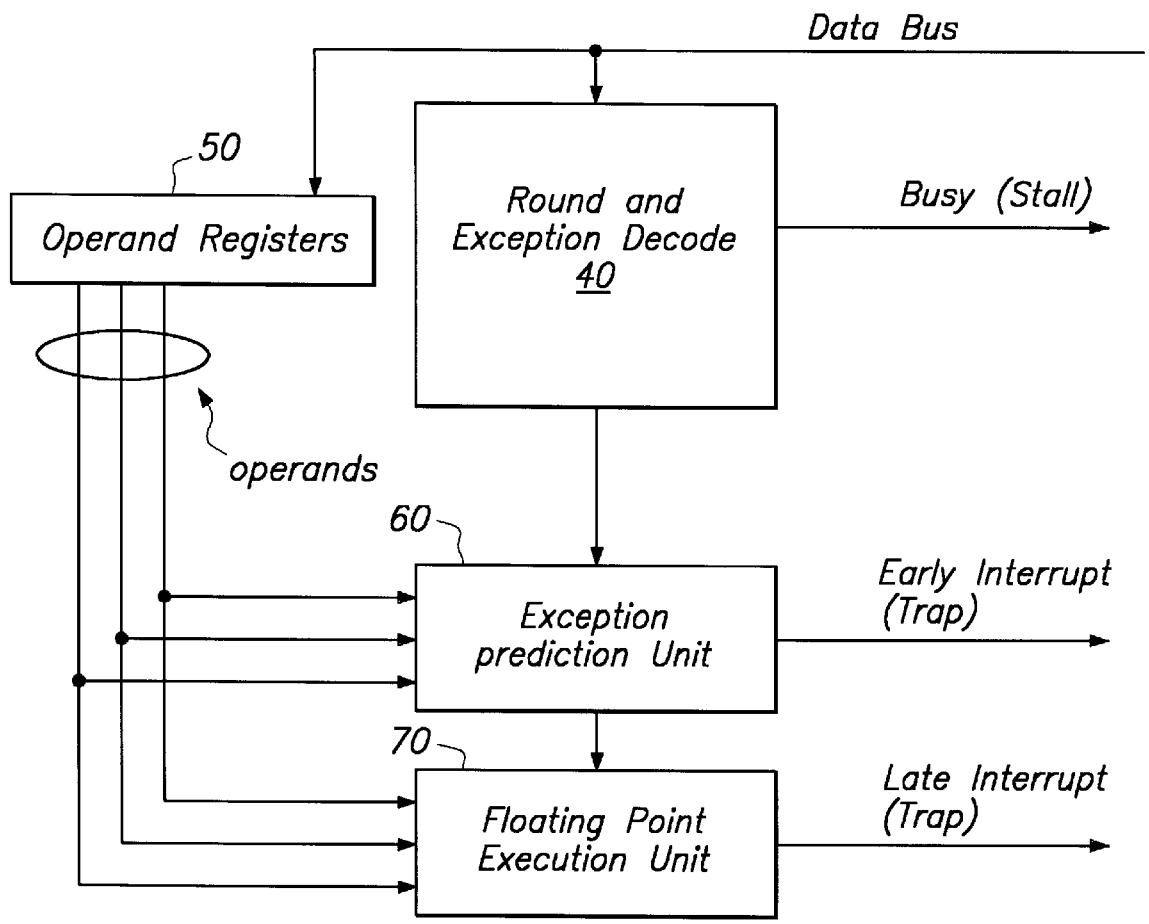

As indicated in FIG. 9, the two configurations shown in FIGS. 7 and 8 may be combined to produce a floating-point system which takes no exceptions when default handling is specified, except as required by limitations of floating-point execution unit 70, which may be designed not to handle certain exceptional operands or results. To cover these cases, exception prediction unit 60 predicts which operations may require such special handling and cause immediate exceptions. When exception trapping is specified by the rounding and exception control bits of the instruction, the processor is signaled to stall by round and exception decode unit 40, thus temporarily shutting down the pipeline until the floating-point unit completes the operation and makes a final determination of whether a trap is required. Still, the operand values are not involved in the determination of whether to stall the pipeline, and exception prediction unit 60 causes an exception itself, rather than a stall of the pipeline.

Although the elements of the present invention have been described in conjunction with a certain embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

We claim:

1. A system comprising:
a central processing unit (CPU) responsive to arithmetic CPU instructions;
said arithmetic CPU instructions including a flag, said flag comprised of at least one bit, wherein when said flag is in a first condition said CPU is permitted to generate a trap to indicate that an arithmetic result cannot be precisely represented in a CPU register and when said flag is in a second condition said trap will not be generated.

2. The system described in claim 1 wherein said instruction also includes information indicating the manner in which said arithmetic result should be rounded when said flag is in said second condition.

3. The system as described in claim 2 wherein said rounding information comprises a group of bits having four possible states, said rounding states comprising:
a. a first state indicating that said arithmetic result should be truncated;
b. a second state indicating that said arithmetic result should be rounded to a nearest value represented in a given register precision;
c. a third state indicating that said arithmetic result should be rounded to a nearest value in a positive direction represented in said given register precision;
d. a fourth state indicating that said arithmetic result should be rounded to a nearest value in a negative direction represented in said given register precision.

4. The system as described in claim 3 wherein in the case of said second state, exceptions can be handled in one of first and second manners wherein in said first manner all exceptions other than an inexact exception generated in said system due to said arithmetic result cause an exception trap and wherein in said second manner all exceptions generated in said system due to said arithmetic result are processed using IEEE standard default exception handling.

5. An arithmetic instruction executed by a central processing unit (CPU) to calculate an arithmetic result comprising:
a first portion indicating a type of arithmetic operation to be performed;
a second portion indicating registers within said CPU to be used to calculate said arithmetic result;
a third portion corresponding to a mode flag, said mode flag having a first and second state, said first state of said mode flag indicating that an exception is permitted to be generated when said CPU calculates an arithmetic result, said second state of said mode flag indicating that said exception will not be generated when said CPU calculates said arithmetic result, and said arithmetic result cannot be precisely represented in said registers in said CPU; and
a fourth portion corresponding to rounding information, said rounding information indicating the manner in which said arithmetic result is rounded when said mode flag is in said second state.

6. The instruction as described in claim 5 wherein said rounding information comprises a group of bits having four possible states, said rounding states comprising:
a. a first state indicating that said arithmetic result should be truncated;
b. a second state indicating that said arithmetic result should be rounded to the nearest value represented in a current precision of said registers;
c. a third state indicating that said arithmetic result should be rounded to a nearest value in a positive direction represented in said current precision of said registers;
d. a fourth state indicating that said arithmetic result should be rounded to a nearest value in a negative direction represented in said current precision of said registers.

7. The instruction as described in claim 6 wherein in said second state, exceptions can be handled in one of first and second manners wherein in said first manner all exceptions other than an inexact exception generated in said system due to said arithmetic result cause an exception trap and wherein in said second manner all exceptions generated in said system due to said arithmetic result are processed using IEEE standard default exception handling.

8. The instruction as described in claims 7 wherein said instruction is a floating-point arithmetic instruction.

9. A method used when calculating an arithmetic result in a central processing unit (CPU) with a processor instruction, said method comprising the steps of:
including a mode flag in said processor instruction, said mode flag having a first and second state, said first state indicating that an exception is permitted to be generated when said CPU calculates said arithmetic result and said second state indicating that said exception will not be generated when said CPU calculates said arithmetic result;
including rounding information in said processor instruction;
executing said exception when said mode flag is in said first state; and
rounding said arithmetic result according to said rounding information when said mode flag is in said second state.

10. The method of as described in claim 9 wherein said rounding information comprises a group of bits having four possible states, said rounding states comprising:
a. a first state indicating that said arithmetic result should be truncated;

b. a second state indicating that said arithmetic result should be rounded to a nearest value represented in a given register precision;

c. a third state indicating that said arithmetic result should be rounded to a nearest value in a positive direction represented in said given register precision;

d. a fourth state indicating that said arithmetic result should be rounded to a nearest value in a negative direction represented in said given register precision.

11. The method as described in claim 10 wherein in said second state, exceptions can be handled in one of first and second manners wherein in said first manner all exceptions other than an inexact exception generated in said system due to said arithmetic result cause an exception trap and wherein in said second manner all exceptions generated in said system due to said arithmetic result are processed using IEEE standard default exception handling.

12. The method as described in claims 11 wherein said instruction is a floating-point arithmetic instruction.

13. In a computing system which performs arithmetic operations on operands in response to arithmetic instructions, said instructions having an operand portion and an operation indicator portion, a trap processing system comprising:

a round and exception unit operating in response to exception and rounding information of said arithmetic instructions and independent of said operand portion, generating round control signals, and in a first case, causing said computing system to stall to determine whether a late arithmetic exception trap is to occur and generating trap enable signals for permitting said late arithmetic exception trap to occur, and in a second case, not causing said computing system to stall and disabling said trap enable signals; and a floating point arithmetic execution unit for performing said arithmetic operations in response to said round control signals and said trap enable signals, said operand portion and said operation indicator portion and generating a resultant of said performed operations and, in a first case, generating exception indicator signals for causing said late arithmetic exception trap to occur, and in a second case, disabling said exception indicator signals.

14. In a computing system which performs arithmetic operations on operands in response to arithmetic instructions, said instructions having an operand portion and an operation indicator portion, a trap processing system comprising:

a round and exception unit operating in response to exception and rounding information portion of said arithmetic instructions and independent of said operand portion, generating round control signals;

an exception prediction unit for evaluating characteristics of said operand portion and causing an early arithmetic exception trap to occur depending on said operand characteristics;

a arithmetic execution unit for performing said arithmetic operations in response to said round control signals, said operand portion, and said operation indicator portion and generating a resultant of said performed operations.

15. In a computing system which performs arithmetic operations on operands in response to arithmetic instructions, said instructions having an operand portion and an operation indicator portion, a trap processing system comprising:

a round and exception unit operating in response to exception and rounding information of said arithmetic instructions and independent of said operand portion, generating round control signals, and in a first case, causing said computing system to stall to determine whether a late arithmetic exception trap is to occur and generating trap enable signals for permitting said late arithmetic exception trap to occur, and in a second case, not causing said computing system to stall and disabling said trap enable signals;

an exception prediction unit for evaluating characteristics of said operand portion and causing an early arithmetic exception trap to occur depending on said operand characteristics; and a floating point arithmetic execution unit for performing said arithmetic operations in response to said round control signals and said trap enable signals, said operand portion and said operation indicator portion and generating a resultant of said performed operations and, in a first case, generating exception indicator signals for causing said late arithmetic exception trap to occur, and in a second case, disabling said exception indicator signals.

16. The system as described in claims 4, 13, 14 or 15 wherein said instruction is a floating-point arithmetic instruction.

\* \* \* \* \*